United States Patent
Dittmer et al.

(10) Patent No.: US 8,253,106 B2
(45) Date of Patent: Aug. 28, 2012

(54) DEVICE AND METHOD FOR DETECTING FLAMES

(75) Inventors: Hauke Dittmer, Fehmarn Ot. Bannesdorf (DE); Dirk Siemer, Rethwisch (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 206 days.

(21) Appl. No.: 12/800,264

(22) Filed: May 12, 2010

(65) Prior Publication Data

US 2010/0288929 A1  Nov. 18, 2010

(30) Foreign Application Priority Data

May 13, 2009  (EP) ..................................... 09006434

(51) Int. Cl.
*G01J 5/02* (2006.01)
(52) U.S. Cl. ................. 250/339.15
(58) Field of Classification Search .......... 250/330–335, 250/336.1–336.2, 337, 338.1–338.5, 339.01–339.15, 250/340, 341.1–341.8, 342–353
See application file for complete search history.

(56) References Cited

U.S. PATENT DOCUMENTS

| | | | |
|---|---|---|---|
| 3,940,753 A * | 2/1976 | Muller | 250/338.1 |
| 3,952,196 A | 4/1976 | Larsen | |
| 4,160,163 A | 7/1979 | Nakauchi | |
| 4,233,596 A | 11/1980 | Okamoto et al. | |
| 4,415,806 A * | 11/1983 | Tar | 250/339.15 |
| 4,463,260 A | 7/1984 | Ikeda | |
| 4,547,673 A | 10/1985 | Larsen et al. | |
| 5,257,013 A | 10/1993 | Lewkowicz | |
| 5,811,811 A * | 9/1998 | Naya | 250/339.15 |
| 5,914,489 A | 6/1999 | Baliga et al. | |
| 6,239,435 B1 | 5/2001 | Castleman | |
| 7,218,222 B2 * | 5/2007 | Eskildsen et al. | 340/541 |
| 2005/0195086 A1 | 9/2005 | King | |
| 2008/0296502 A1 | 12/2008 | Kudoh | |

FOREIGN PATENT DOCUMENTS

| | | |
|---|---|---|
| AT | 381 406 | 10/1986 |
| CH | 628 171 | 2/1982 |
| DE | 31 40 678 | 5/1982 |
| DE | 42 40 395 | 6/1994 |

(Continued)

OTHER PUBLICATIONS

European Search Report dated Sep. 25, 2009 with English translation of same.

*Primary Examiner* — Kiho Kim
(74) *Attorney, Agent, or Firm* — Collard & Roe, P.C.

(57) ABSTRACT

A device for detecting flames in which at least two identical detectors are disposed next to one another. Each detector has an identical signal processing circuit having an amplifier and an A/D converter, and a symmetrical and similar layout, i.e., conductor track placement. Each of the detectors covers a different wavelength range, by way of a preceding filter, and the signal detection takes place at the same time and synchronously, so that a precise analysis of the received radiation occurs using simple algorithms, independent of disruptive influence variables. By using the same detectors and the same signal processing systems, as well as the symmetrical and similar configuration of the conductor track placement, as well as the synchronous control of the signal recording, interference variables occur uniformly on all optical reception channels. This uniform interference can be compensated without complicated algorithms.

10 Claims, 3 Drawing Sheets

FOREIGN PATENT DOCUMENTS

| | | |
|---|---|---|
| DE | 203 06 590.5 | 8/2003 |
| DE | 10 2008 024 496 | 12/2008 |
| EP | 0 078 443 | 5/1983 |
| EP | 0 926 647 | 6/1999 |
| FR | 2 380 542 | 9/1978 |
| GB | 2 020 417 | 11/1979 |
| GB | 2 065 880 | 7/1981 |

* cited by examiner

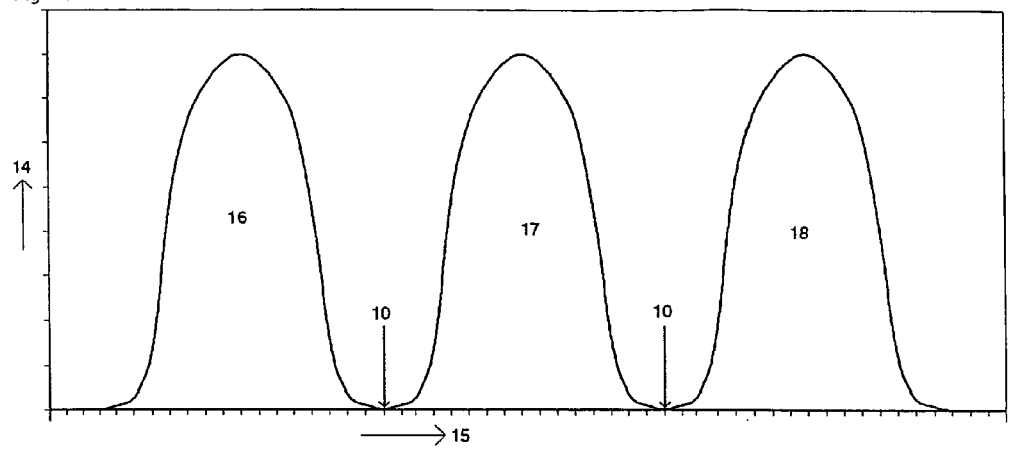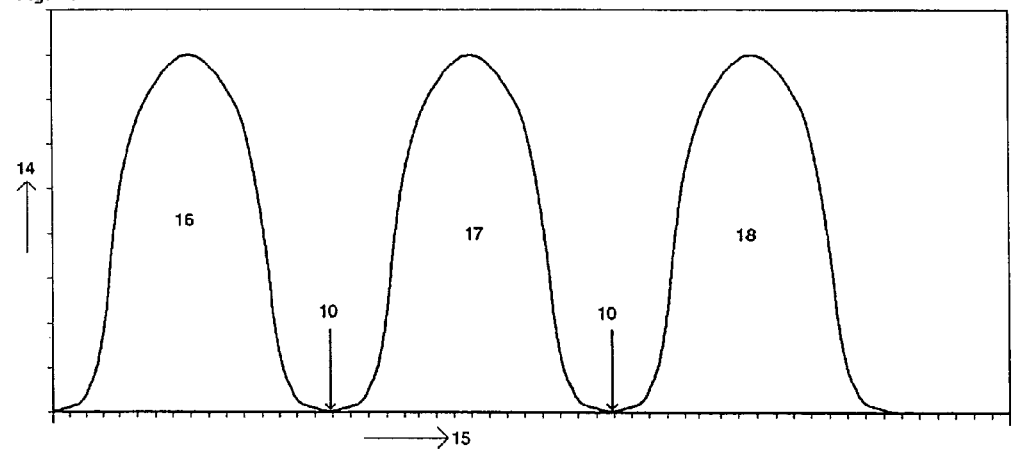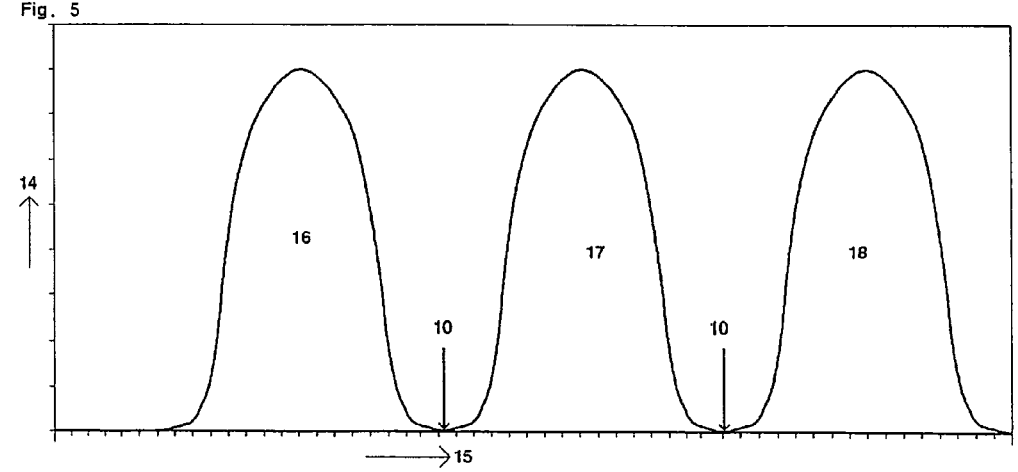

DEVICE AND METHOD FOR DETECTING FLAMES

CROSS REFERENCE TO RELATED APPLICATIONS

Applicants claim priority under 35 U.S.C. 119 of European Application No. 09006434.6 filed May 13, 2009.

BACKGROUND OF THE INVENTION

1. Field of the Invention

The invention relates to a device for detecting flames with detectors and to a method for detecting flames by means of detectors.

The invention can be used wherever reliable recognition of flames, independent of disruptive influence variables such as ambient temperature, interference radiation, or the viewing angle of the recording or detection device is required.

2. The Prior Art

For detecting flames using alarms or fire extinguishing devices, it is known to detect the wavelength of the flames with a detector, to convert it to an electrical signal, and to pass this signal on to a subsequent evaluation device for evaluating the detector signal.

EP 0 926 647 B1 describes a fire detection method for recognizing a fire in a monitored region, in which method sensors are used, which react to a radiation within a specific bandwidth.

No consideration of the angle and temperature dependence takes place. There is no provision for preventing the three wavelength ranges from overlapping at minimal/maximal temperature and at a maximal incidence angle. The cross-correlation is used. This is not necessary in the present invention, because of the synchronous sampling of the signals and the symmetrical structure.

Austrian Application No. AT381406 B and Swiss Application No. CH000000628171A show a similar device, in which only two sensors are used, and the bearing frequency is filtered out by means of a hardware circuit, a bypass. No consideration of the angle dependence takes place. Also, no digital signal processing by way of a microcontroller is described.

German Patent Application No. DE 102008024496A1, a device for detecting flames is described, in which two sensors are present. This device is also not suitable for taking the angle dependence into consideration. Also, no digital signal processing by way of a microcontroller takes place.

German Patent Application No. DE 3140678 A1 describes an infrared (IR) flame alarm having three IR sensors. Minimization of false alarms is only accomplished with regard to the masking of IR radiation from sources in the range of 2 to 5 µm, which do not represent flames. No solutions are described that use identical detectors with identical signal processing for simple masking of interference variables. It is a disadvantage of this solution that electromagnetic radiation, for example, in the MHz or GHz frequency range, for example, which can also be coupled into the electronic circuit after the sensors, can lead to a false alarm. No solutions are described that can prevent such false alarms U.S. Pat. No. 4,233,596 describes an infrared measurement device having two IR sensors with different wavelengths, in order to detect black smoke in a useful flame (flare). It is a disadvantage that this device cannot be used for recognition of flames that occur randomly during a fire event, to minimize false alarms.

It is a problem in the case of the known devices for detecting flames that distortions of the detected wavelengths occur due to interference of influence variables such as the ambient temperature, interference radiation, for example sun radiation, or the viewing angle at which the detection device is disposed, so that due to a false alarm, triggering of the alarm device or the fire extinguishing device could occur. Furthermore, it is problematic that in the known devices, complicated calculation methods and long measurement cycles become necessary for partial compensation of these interference variables. This is connected with a high consumption of energy and a long reaction time for flame recognition.

US Patent Application No. 2005/195086 A1 describes an IR flame alarm having three different IR receiver elements. The signals of the detectors go directly, serially into the processor. This means that no synchronous signal pickup at the same time is possible. No solution is described that uses identical detectors with identical signal processing for simple masking of interference variables that lead to false alarms. In particular, the description that the signals of the detectors go directly, serially into the processor shows that no synchronous signal pickup at the same time is possible.

SUMMARY OF THE INVENTION

It is therefore an object of the invention to develop a device and a method in which the result of the detection is not distorted, or only distorted very little, by disruptive influence variables such as the ambient temperature, interference radiation, viewing angle, and in which simple and energy-saving signal evaluation takes place, and short reaction times for flame detection are adhered to.

This object is accomplished by means of a device for detecting flames with a detector, with a subsequent evaluation unit for evaluation of the detector signal, and by a method for detecting flames.

The device according to the invention for detecting flames via a detector with subsequent evaluation device for evaluation of the detector signals has at least two identical detectors, which are disposed next to one another. It is important that the detectors are identical. Each detector is provided with an identical signal processing and a symmetrical and similar layout. The signal processing involves amplifier(s) and A/D (analog-to-digital) converter(s). Each of the detectors is situated behind a filter that precedes it, and which filters out different wavelengths. The amplifiers are integrated into the sensors. The signal is therefore amplified directly at the source. Influences of electromagnetic radiation are therefore minimized, and do not have to be masked out by complicated algorithms. Integration of the A/D converter the sensors is also possible for this reason.

Signal detection must take place at the same time and synchronously, so that precise analysis of the received radiation is possible with simple algorithms, independent of disruptive influence variables. Since the individual signals of the individual detectors all have the same interference variable applied to them, these interference variables can be masked out with a simple algorithm. The value range of the signals is therefore not restricted. Thus, alarm criteria can be calculated from a large number of values.

It is advantageous to use three infrared detectors, whereby the first detector covers a wavelength range above the flame wavelength, the second detector covers a wavelength that is typical for flames, and the third detector covers a wavelength range below the flame wavelength.

It is furthermore important that the preceding filters do not demonstrate any overlap with regard to the wavelength ranges, over the viewing angle range and the ambient temperature ranges.

It is also advantageous to dispose a window in front of the detectors and the filters.

Furthermore, each detector can be monitored for function and viewing capacity, using a separate radiation source. Corresponding measures are known to a person skilled in the art. For this purpose, radiation sources in the wavelength range of the filters and reflection elements can be used.

In one embodiment, a microcontroller unit takes over synchronous control of the signal processing, and thus allows energy-saving operation.

By using the same detectors and the same signal processing systems, as well as the symmetrical and similar configuration of the conductor track placement, as well as by means of synchronous control of the signal recording, it is ensured that interference variables, such as electromagnetic radiation, for example, occur uniformly on all the optical reception channels. These uniform interference values can be compensated very quickly and efficiently without complicated algorithms, such as cross-correlation, for example.

Furthermore, calculation methods that require time and energy are eliminated, since all the signals are recorded synchronously, in other words at the same time.

Rapid detection of flames is often decisive for control of extinguishing systems, and minimizes fire damage.

Energy-saving circuits such as the ones in the present invention are important in fire alarm systems, which are generally supplied with emergency power by way of rechargeable batteries.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 3 shows filter pass-through curves without wave shifts;

FIG. 4 shows filter pass-through curves with maximal negative wave shift; and FIG. 5 shows filter pass-through curves with maximal positive wave shift.

DETAILED DESCRIPTION OF THE PREFERRED EMBODIMENT

Figure 1:
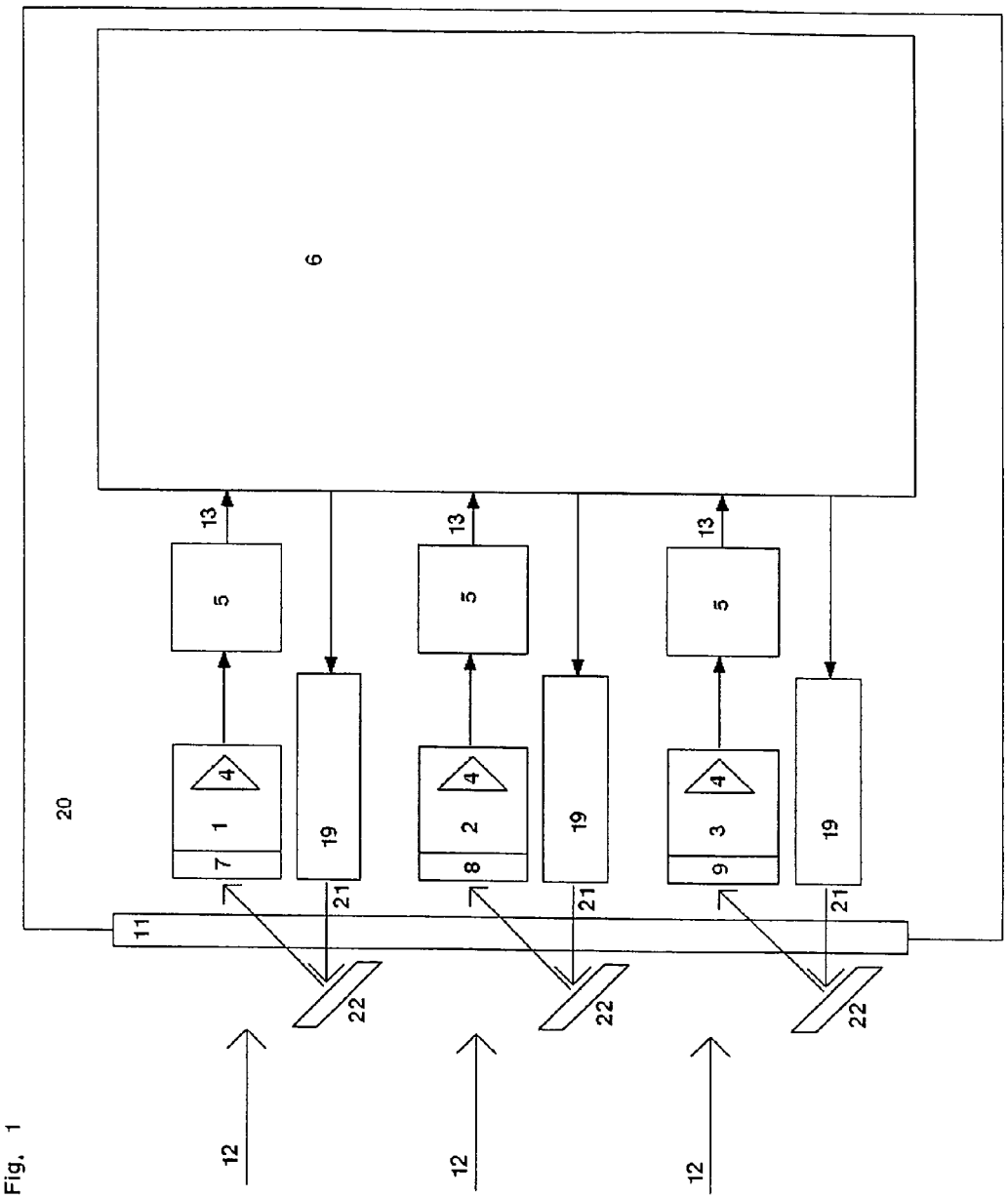
FIG. 1 shows a schematic representation of the device according to an embodiment of the invention for detecting flames.

Referring now in detail to the drawings, FIG. 1 shows a radiation 12 that impacts the device according to the invention, shown as flame alarm 20, in which identical detectors 1, 2, and 3 are disposed next to one another or one on top of the other. A filter 7, 8, 9 precedes the three detectors 1, 2, 3. A window 11 is disposed on flame alarm 20, in front of filters 7, 8, 9. Each filter 7, 8, 9 filters out a specific wavelength ahead of the corresponding detector 1, 2, 3. Amplifier 4 integrated into the detectors amplifies the signal of the detectors. This signal is simultaneously sampled with the A/D converters 5, and passed on to the microcontroller 6 by way of a serial interface 13. An alarm signal is calculated from the signals of the individual detectors 1, 2, 3, with the elimination of interference signals, and an alarm is triggered if necessary. Possible contamination of the optical window 20 or a defect of detectors 1, 2, 3 is detected using radiation sources 19 within and reflectors 22 outside of the flame alarm 20. Radiation sources 19 emit a radiation 21 that lies in the wavelength range of filter 7, which radiation is reflected at the reflectors 22 and reaches detectors 1, 2, 3 through the optical window 11.

Figure 2:
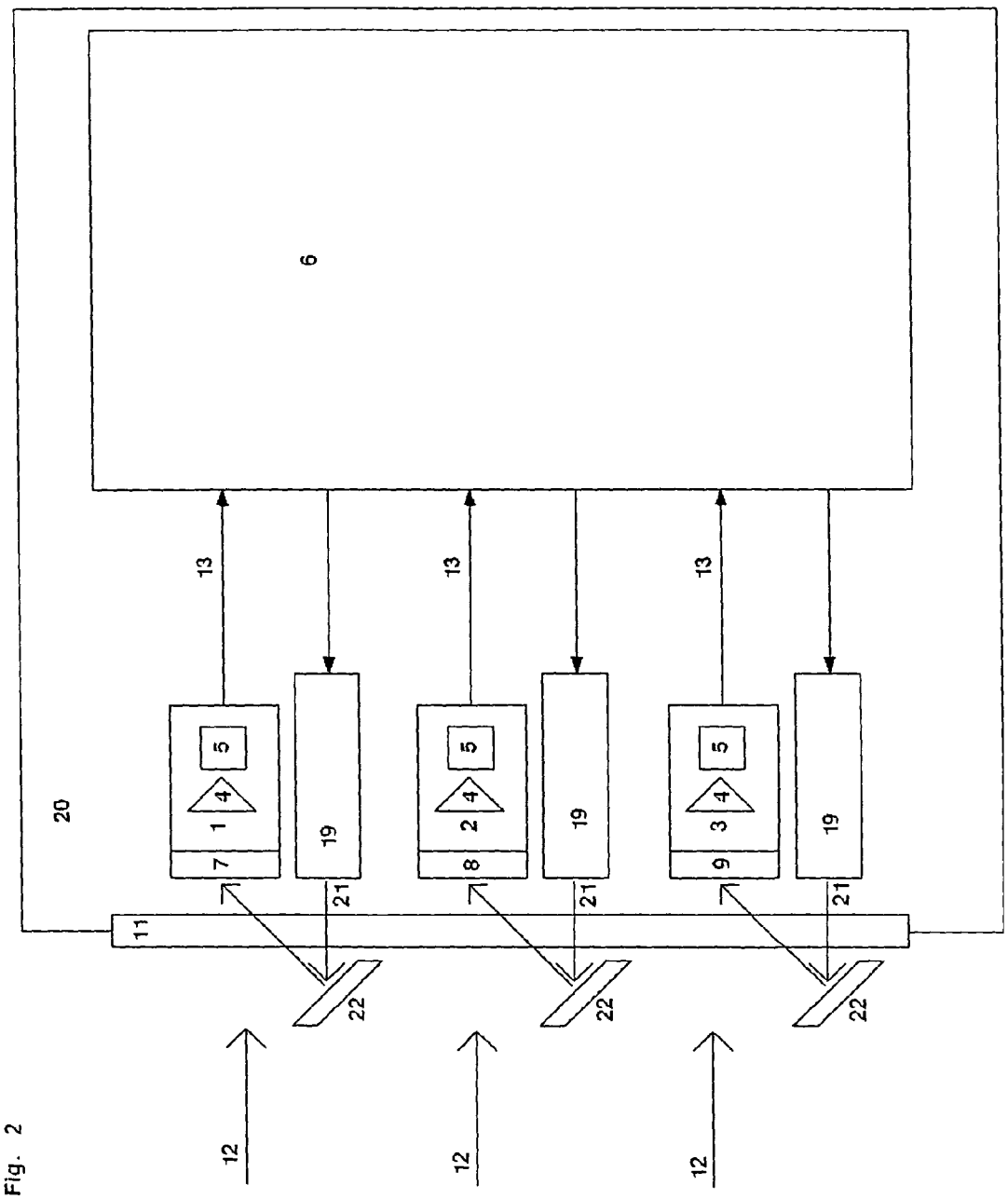
FIG. 2 shows a schematic representation of the device according to the invention for detecting flames, with A/D converters integrated into the detectors.

FIG. 2 shows a similar representation, but the A/D converters 5 are integrated into detectors 1, 2, 3.

FIGS. 3 to 5 represent filter pass-through curves, whereby transmission 14 is plotted above wavelength 15. Wavelengths are detected by each detector 1, 2, 3, after they pass through filters 7, 8, 9 that precede them. FIGS. 4 and 5 represent maximal negative wavelength shifts and maximal positive wavelength shifts due to different incidence angles of the radiation. The first wavelength range (Curve 16) corresponds to the transmission range of filter 7 below the wavelength range of flames. The middle wavelength range (Curve 17) corresponds to the transmission range of filter 8 in the wavelength range of the flames to be expected. The wavelength range on the right (curve 18) corresponds to the transmission range of filter 9 above the wavelength range of the flames to be expected. Between wavelength ranges 16, 17, 18 there is a range 10 in which only a very slight overlap between the ranges occurs.

In this connection, the wavelength used for flame detection is middle wavelength 17, while a second wavelength below this range 16 or above this range 18 is selected. Ideally, wavelength 17 of fires that contain carbon is in a range that corresponds to the CO and $CO_2$ bands and minimizes the influence of sun radiation. For flames, the intensity of the signal of the wavelength ranges 16, 18 above and below the middle wavelength range 17 is very much less than the intensity of the signal in the middle wavelength range. The ratio between the signals is evaluated. In the case of different incidence angles, the transmission range of the filters 7, 8, 9 changes. In order to be able to evaluate the ratio of the signals, the transmission ranges of filters 7, 8, 9 are not allowed to overlap at different temperatures and different incidence angles, or are only allowed to overlap slightly, in real terms.

Accordingly, while only a few embodiments of the present invention have been shown and described, it is obvious that many changes and modifications may be made thereunto without departing from the spirit and scope of the invention.

What is claimed is:

1. A device for detecting flames comprising:
    at least two identical detectors disposed next to each other;
    a filter preceding each detector, by which filter each of said detectors covers a different wavelength range; and
    identical signal processing systems assigned to each detector for detecting signals of each detector, said signal processing systems having symmetrical and similar conductor track placement and comprising:
        an amplifier integrated into each detector; and
        an A/D converter;
    wherein the device carries out the signal detection of each detector at the same time and synchronously, and
    wherein external interference variables are compensated for via algorithms.

2. The device according to claim 1, wherein three infrared detectors are used, wherein a first one of the detectors covers a wavelength range above a flame wavelength, a second one of the detectors covers a wavelength that is typical for flames, and a third one of the detectors covers a wavelength range below the flame wavelength.

3. The device according to claim 2, wherein the filters do not demonstrate any overlap regarding wavelength ranges over a viewing angle range and ambient temperature ranges.

4. The device according to claim 2, further comprising separate radiation sources for monitoring each detector for function and viewing capacity, wherein the radiation sources are disposed inside of the flame detector and the reflectors are disposed outside of the flame detector, and wherein the radiation sources emit radiation in a wavelength range of a respective filter.

5. The device according to claim 1, wherein a window is disposed in front of the detectors.

6. The device according to claim 1, further comprising a microcontroller connected to the signal processing systems, wherein said microcontroller controls the detectors synchronously, controls the signal processing and allows for a power-saving operation.

7. The device according to claim 1, wherein the A/D converter is integrated into each detector.

8. A method for masking out interference variables when detecting flames using a device having at least two identical detectors disposed next to one anther and that detect signals of different wavelengths via a filter preceding each detector, the method comprising the following steps:

detecting at least two signals of different wavelength ranges of the radiation at the same time and synchronously by the at least two detectors; and processing the signals in identical signal processing circuits each having an amplifier and an A/D converter, the amplifiers being integrated into each of the detectors so that signal processing takes place directly at the source of the signal, the signal processing circuits having a symmetrical and similar conductor track placement, wherein interference variables, which are superimposed on the signals of each of the detectors, are masked out with algorithms.

9. The method according to claim 8, wherein the signals are sampled synchronously via a microcontroller.

10. The method according to claim 8, wherein the algorithms evaluate the ratio between the signals for a middle wavelength of a range of a flame wavelength and signals above and below the range.

* * * * *